(12) United States Patent
Zhang et al.

(10) Patent No.: US 12,397,389 B2
(45) Date of Patent: Aug. 26, 2025

(54) METHODS FOR CUTTING TOOLS TEST

(71) Applicant: CHENGDU AIRCRAFT INDUSTRIAL (GROUP) CO., LTD., Sichuan (CN)

(72) Inventors: Xuemei Zhang, Chengdu (CN); Debiao Zeng, Chengdu (CN); Changyong Zhao, Chengdu (CN); Xuezhen Chen, Chengdu (CN); Yuliang Yue, Chengdu (CN); Jian Gan, Chengdu (CN); Liangliang Feng, Chengdu (CN); Bing Dai, Chengdu (CN); Zhi Cheng, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 0 days.

(21) Appl. No.: 19/019,387

(22) Filed: Jan. 13, 2025

(65) Prior Publication Data
US 2025/0153298 A1 May 15, 2025

Related U.S. Application Data

(63) Continuation of application No. PCT/CN2023/100683, filed on Jun. 16, 2023.

(30) Foreign Application Priority Data

Jul. 13, 2022 (CN) .......................... 202210818057.7

(51) Int. Cl.
| | | |
|---|---|---|
| B23Q 17/09 | (2006.01) | |
| B25J 9/16 | (2006.01) | |
| B25J 11/00 | (2006.01) | |

(52) U.S. Cl.
CPC ........ *B23Q 17/0904* (2013.01); *B25J 9/1669* (2013.01); *B25J 11/0055* (2013.01)

(58) Field of Classification Search
None
See application file for complete search history.

(56) References Cited

U.S. PATENT DOCUMENTS

| | | | | |
|---|---|---|---|---|
| 2009/0067704 A1* | 3/2009 | Du | ......................... | G01B 11/24 |
| | | | | 382/152 |
| 2018/0085877 A1* | 3/2018 | Agudelo | ............ | G05B 23/0275 |

(Continued)

FOREIGN PATENT DOCUMENTS

| | | |
|---|---|---|
| CN | 101489718 A | 7/2009 |
| CN | 103076764 A | 5/2013 |

(Continued)

OTHER PUBLICATIONS

International Search Report in PCT/CN2023/100683 mailed on Oct. 8, 2023, 6 pages.

(Continued)

*Primary Examiner* — David Earl Ogg
(74) *Attorney, Agent, or Firm* — Porus IP LLC

(57) ABSTRACT

A method for cutting tool test implemented by a system for cutting tool test. The system includes a cutting tool management system, a cutting tool test monitoring system, a cutting tool pre-adjustment test system, an industrial control system, and a robot. The cutting tool management system establishes a cutting tool component assembly task and sends to the cutting tool test monitoring system; the cutting tool test monitoring system establishes a measurement form and sends to the cutting tool pre-adjustment test system; the cutting tool pre-adjustment test system measures according to the measurement form, and feeds back a measurement result to the cutting tool test monitoring system; the cutting tool test monitoring system sends a final updated cutting tool (Continued)

measurement form to the cutting tool management system; the industrial control system receives state information of the robot and send task information of the robot to control the robot for a robot-assisted measurement.

3 Claims, 2 Drawing Sheets

(56) References Cited

U.S. PATENT DOCUMENTS

| | | | |
|---|---|---|---|
| 2020/0174444 A1 | 6/2020 | Bruck | |
| 2021/0240162 A1* | 8/2021 | Zoller | ............. G05B 19/40938 |

FOREIGN PATENT DOCUMENTS

| | | | |
|---|---|---|---|
| CN | 103616855 A | 3/2014 | |
| CN | 104408554 A | 3/2015 | |
| CN | 205497074 U | 8/2016 | |
| CN | 108008697 A | 5/2018 | |
| CN | 108133244 A | 6/2018 | |
| CN | 110657745 A | 1/2020 | |
| CN | 110991860 A | 4/2020 | |
| CN | 111015321 A | 4/2020 | |
| CN | 111061220 A | 4/2020 | |
| CN | 112486108 A | 3/2021 | |
| CN | 113592244 A | 11/2021 | |
| CN | 113843645 A | 12/2021 | |
| CN | 114888543 A | 8/2022 | |
| JP | 2008238356 A | 10/2008 | |
| JP | 2016200928 A | 12/2016 | |
| JP | 2016218550 A | 12/2016 | |
| JP | 2021074812 A | 5/2021 | |
| JP | 2021142613 A | 9/2021 | |
| WO | WO-2021029214 A1 * | 2/2021 | |

OTHER PUBLICATIONS

Written Opinion in PCT/CN2023/100683 mailed on Oct. 8, 2023, 5 pages.
He, Zhengqiang, Research on central tool magazine management and distribution system of flexible production line, Chinese Excellent Master's Dissertation Full Text Database Engineering Science and Technology I series, 69 pages, 2017.
Wang, Huifen, Digital Design and Manufacturing Technology, Harbin Engineering University Press, 2015, 12 pages.
First Office Action in Chinese Application No. 202210818057.7 mailed on Aug. 23, 2022, 17 pages.
Notification to Grant Patent Right for Invention in Chinese Application No. 202210818057.7 mailed on Sep. 27, 2022, 5 pages.

* cited by examiner

METHODS FOR CUTTING TOOLS TEST

CROSS-REFERENCE TO RELATED APPLICATIONS

This application is a continuation of international patent application No. PCT/CN2023/100683, filed on Jun. 16, 2023, which claims priority to Chinese application No. 202210818057.7, filed on Jul. 13, 2022, the entire contents of which are incorporated herein by reference.

TECHNICAL FIELD

Some embodiments of the present disclosure are in a technical field of a cutting tool measurement system, and specifically relate to a method for cutting tool test.

BACKGROUND

A preparation mode of existing production line cutting tools requires two operators for stereoscopic warehouse outbound operation, two operators for cutting tool assembly and disassembly, and two operators for cutting tool measurement. However, an existing measurement process does not involve a fully automated macro-programmed measurement. In the existing measurement process, focusing on a measurement point needs to be done manually, which takes a long time for measuring, a measurement accuracy relies on a manual determination, and the measurement needs to be calibrated for a second time. The system for cutting tool test helps to make the process for cutting tool measurement more efficient and more accurate.

In the existing cutting tool assembly model, a shank and the cutting tool are assembled by manually reading a serial number engraved on the shank and a cutting tool drawing number on the cutting tool to determine accuracy and compatibility of the assembly and the process requirement. The engraved serial number of the shank is easy to wear out, and a difference between cutting tools with similar cutting tool drawing numbers is determined manually. In the process of assembly and measurement, a problem of incorrectly matching the cutting tools is likely to occur, which leads to an he occurrence of major quality accidents. On the other hand, the steps of the existing assembly and measurement modes are cumbersome and redundant, and a cutting tool management system is separated from a cutting tool assembly station, so that the operator manually determines that the cutting tool and the shank comply with the process requirement according to an assembly task from the cutting tool management system. After assembly, the operator enters the cutting tool management system for assembling cutting tool assembly information, which is inefficient.

Accordingly, some embodiments of the present disclosure provide a method for cutting toll test, which intends to address the foregoing issues.

SUMMARY

Embodiments of the present disclosure are realized mainly by the following technical solutions.

Embodiments of the present disclosure provide a method for cutting tool test. The method is performed by a system for cutting tool test. The system for cutting tool test includes a cutting tool management system, a cutting tool test monitoring system, a cutting tool pre-adjustment test system, an industrial control system, and a robot connected in sequence. The industrial control system is connected to the cutting tool test monitoring system and the robot, respectively. The cutting tool management system is used to establish a cutting tool component assembly task and send the cutting tool component assembly task to the cutting tool test monitoring system after completing a cutting tool outbound task. The cutting tool test monitoring system is used to establish a cutting tool measurement form (or a measurement form) based on a tool holder cart as a unit, and after receiving a cutting tool preparation signal of the tool holder cart, match the cutting tool preparation signal of the tool holder cart and the corresponding cutting tool measurement form and send the cutting tool measurement form to the cutting tool pre-adjustment test system. The cutting tool pre-adjustment test system is used to measure according to the cutting tool measurement form, and feedback a cutting tool measurement result to the cutting tool test monitoring system for updating the cutting tool measurement form. The cutting tool test monitoring system is used to send a final updated cutting tool measurement form to the cutting tool management system. The industrial control system is used to receive state information of the robot and send task information of the robot to control the robot for a robot-assisted measurement. The method includes following operations: step S100: selecting a working mode of the cutting tool test monitoring system, and in response to selecting a manual mode, controlling the cutting tool pre-adjustment test system to perform an operation of the cutting tool test monitoring system returning to a reference point, and calibrating a main axis datum point; in response to selecting an automatic mode, controlling the cutting tool pre-adjustment test system to perform a self-test and feedback a ready state, and controlling the robot to perform a self-test and feedback a ready state through the industrial control system, at which time the cutting tool test monitoring system is in a ready state; step S200: after the cutting tool, a shank, and an accessory are outbound, generating the cutting tool component assembly task in the cutting tool management system, the cutting tool component assembly task including information of an assembly drawing, a cutting tool position number of the tool holder cart, a number of the tool holder cart, and a form number. When the cutting tool component assembly task number reaches the cutting tool position number of the tool holder cart, the cutting tool management system pops up a prompt and displays a pending assembly state after an operator confirms an immediate assembly; step S300: establishing the cutting tool measurement form in the cutting tool test monitoring system, the cutting tool measurement form including cutting tool information, shank information, an assembly serial number, a nominal value, the cutting tool position number of the cutting tool carriage, a measurement target position, and a macro program name; step S400: when the cutting tool component assembly task is completed, sending, through the cutting tool management system, a cutting tool measurement task to the cutting tool test monitoring system and updating the cutting tool measurement form, sending the updated cutting tool measurement form to the cutting tool pre-adjustment test system, loading, through the cutting tool pre-adjustment test system, the cutting tool measurement form to a measurement interface of a cutting tool measurement software; after confirming that the cutting tool pre-adjustment test system, the tool holder cart, and the robot are in the ready state, sending, through the cutting tool test monitoring system, a measurement instruction to the cutting tool pre-adjustment test system, and the cutting tool pre-conditioning test system being configured to feedback request information to perform a robot operation; step S500: controlling, through the cutting tool test monitoring system, the robot to perform a task through the industrial control system; and step S600: sending, through the cutting pre-adjustment test system, the cutting tool measurement result to the cutting tool test monitoring system and deleting a local cutting tool measurement form.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
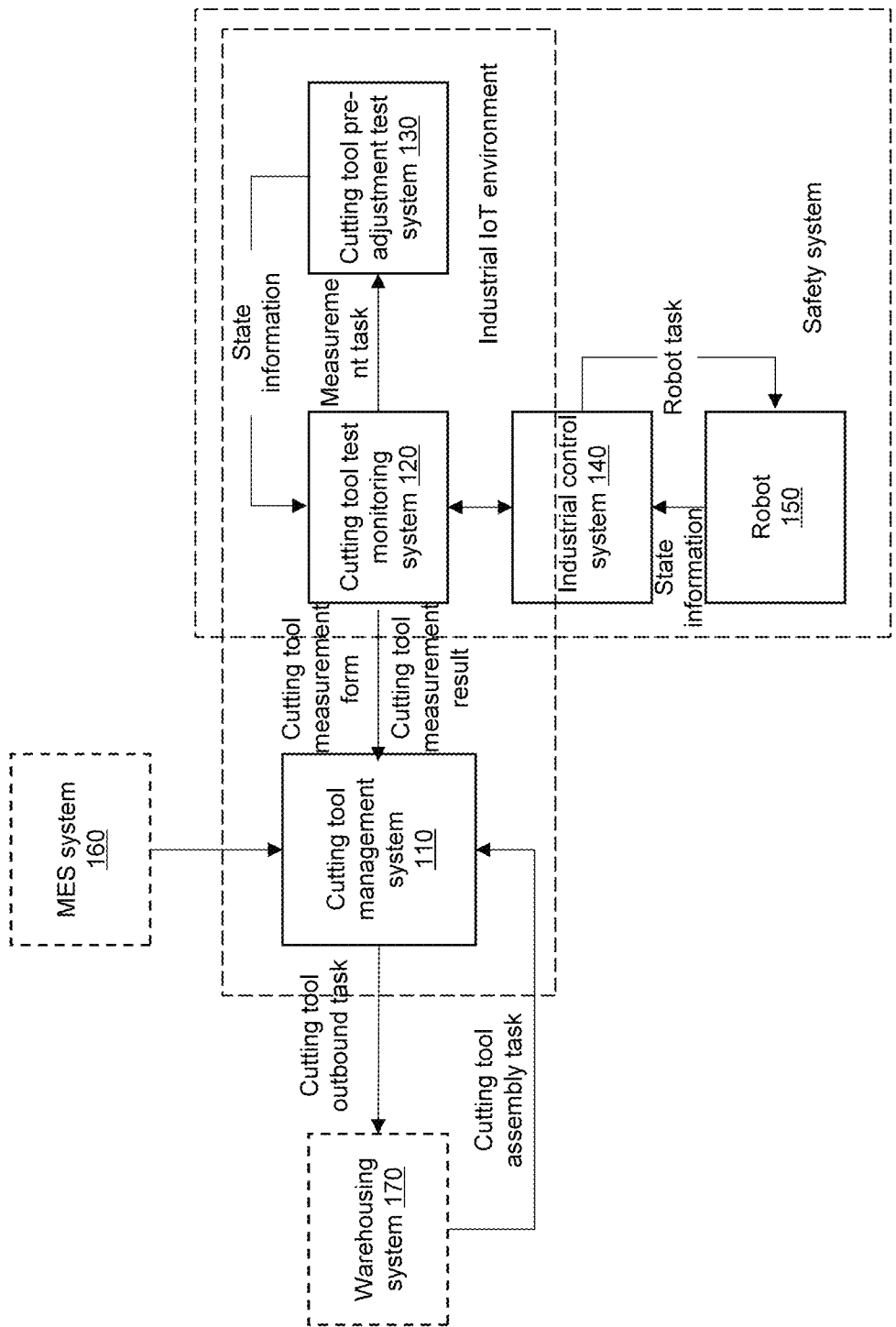
FIG. 1 is a schematic diagram illustrating a structure of a system for cutting tool test according to some embodiments of the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios in accordance with these drawings without creative labor. Unless obviously obtained from the context or the context illustrates otherwise, the same numeral in the drawings refers to the same structure or operation.

Some embodiments of the present disclosure provide a system for cutting tool test, as shown in FIG. 1, including a cutting tool management system 110, a cutting tool test monitoring system 120, a cutting tool pre-adjustment test system 130 (also referred to later as a cutting tool alignment instrument), an industrial control system 140, and a robot 150, which are sequentially communicatively connected.

In some embodiments, the system for cutting tool test also includes a manufacturing execution system (MES) 160 and a warehousing system 170.

In some embodiments, the MES system is configured to send a cutting tool distribution task to the cutting tool management system. The cutting tool management system is further configured to: generate a cutting tool component outbound task (or a cutting tool outbound task) based on the cutting tool distribution task, and send the cutting tool component outbound task to the warehousing system. The warehousing system is configured to implement the cutting tool component outbound task.

The cutting tool distribution task may be generated by the MES system based on a production process requirement and sent to the cutting tool management system. The cutting tool distribution task may contain information such as a cutting tool, a shank, and an accessory required for cutting tool measurement.

The cutting tool management system, after receiving the cutting tool distribution task, may generate the cutting tool component outbound task based on the information of the cutting tool, the shank, the accessory required in the cutting tool distribution task and send the cutting tool component outbound task to the warehousing system.

The cutting tool component outbound task may contain positions of the cutting tool, the shank, and the accessory, a count of the cutting tool, the shank, and the accessory that need to be outbound, or the like.

After receiving the cutting tool component outbound task, the storage system may perform outbound on the cutting tool, the shank, and the accessory involved in the cutting tool component outbound task.

In some embodiments, the cutting tool management system is configured to establish a cutting tool component assembly task and send the cutting tool component assembly task to the cutting tool test monitoring system after completing the cutting tool outbound task. The cutting tool component assembly task includes information of an assembly drawing, a cutting tool position number of a tool holder cart, a number of the tool holder cart, and a form number. More descriptions of the cutting tool component assembly task may be found later in the present disclosure. In some embodiments, the cutting tool test monitoring system is configured to: establish a cutting tool measurement form (or based on the tool holder cart as a unit, and after receiving a cutting tool preparation signal of the tool holder cart, and match the corresponding cutting tool measurement form and send the cutting tool measurement form to the cutting tool pre-adjustment test system.

The cutting tool measurement form refers to a form used to record an intermediate amount of the cutting tool test and a test result, the cutting tool measurement form takes the cutting tool holder car as the unit, which indicates that the cutting tool holder car is in a one-to-one correspondence with the cutting tool measurement form. More descriptions of the cutting tool measurement form may be found later in the present disclosure.

In some embodiments, the cutting tool test monitoring system, after receiving the cutting tool preparation signal of the tool holder cart, sends the cutting tool measurement form corresponding to the tool holder cart to the cutting tool pre-adjustment test system.

In some embodiments, the cutting tool pre-adjustment test system is configured to: measure according to the cutting tool measurement form, and feedback a cutting tool measurement result to the cutting tool test monitoring system for updating the cutting tool measurement form.

In some embodiments, the cutting tool pre-adjustment test system measures (aligns), according to the received cutting tool measurement form, the cutting tool on the tool holder cart corresponding to the cutting tool measurement form based on cutting tool measurement software, the robot, and other devices. In this way, the cutting tool measurement result is obtained. The cutting tool measurement result includes various measurement data required for the cutting tool assembly, for example, the measurement data includes an assembly length, a cutting tool diameter, a cutting tool bottom teeth R, etc.

In some embodiments, the cutting tool pre-adjustment test system provides feedback on the cutting tool measurement result to the cutting tool test monitoring system to facilitate the cutting tool test monitoring system updating the local cutting tool measurement form using the various measurement data included in the cutting tool measurement result. In some embodiments, more descriptions of the cutting tool pre-adjustment test system and the measurement result may be found later in the present disclosure.

In some embodiments, the cutting tool test monitoring system is configured to: send a final updated cutting tool measurement form to the cutting tool management system. The cutting tool management system obtains the various measurement data corresponding to the tool holder cart for use in subsequent processes.

In some embodiments, the industrial control system is configured to: receive state information of the robot and send task information of the robot to control the robot for a robot-assisted measurement.

The state information of the robot may include a current state of various components of the robot, such as a state of an end effector and a position of the robot, or the like.

In some embodiments, the industrial control system issues different categories of task information (task categories) to the robot based on instructions from the cutting tool test monitoring system. More descriptions of the industrial control system and the different categories of task information may be found in the related description later. Using the robot for an assisted measurement is a conventional measurement technique, which is not limited by the present disclosure.

In some embodiments, one or more of the cutting tool management system, the cutting tool test monitoring system, the cutting tool pre-adjustment test system, and the industrial control system have a storage device data-connected thereto. The storage device is used to temporarily store production-related data such as the cutting tool measurement form or the measurement data. More descriptions of the cutting tool management system, the cutting tool test monitoring system, the cutting tool pre-adjustment test system, and the robot may be found later in the present disclosure.

In some embodiments, the system for cutting tool test provided by the present disclosure is performed by one or more components in industrial IoT environment. The industrial IoT environment is formed by a tool holder cart (including a radio frequency identification device (RFID) chip and a tool holder cart ready signal), a cutting tool component with the RFID chip (the cutting tool containing a QR code of a cutting tool parameter, the RFID chip, and a shank serial number explicitly), an RFID chip reader and writer, and a QR code scanner.

In some embodiments, the safety system includes a robot ready, a cutting tool alignment instrument ready, a tool holder cart ready, and a safety device ready.

The cutting tool alignment instrument ready indicates that there is no cutting tool on a cutting tool alignment instrument main axis, a cutting tool alignment instrument main axis lock is released, the cutting tool alignment instrument is in a safe position, the cutting tool alignment instrument main axis is in a cutting tool change position, and an enabling signal is returned;

The robot ready indicates that the robot is idle, fingers of the end effector have no cutting tool, the fingers of the end effector are open, and the robot is in an original position.

The tool holder cart ready indicates a signal issued when a proximity switch or a travel switch corresponding to the tool holder cart is triggered (the tool holder cart is in place)

The safety device ready indicates a signal issued when a protective door is closed, and a safety light curtain at a manual operating position of the cutting tool alignment instrument is unscreened.

In some embodiments, the cutting tool management system receives the cutting tool distribution task sent by the MES system according to the production process requirement and then generates the cutting tool component outbound task such as the outbound of the cutting tool, the shank, the accessory, or the like, and sends the cutting tool component outbound task to the warehousing system. After completing the cutting tool component outbound task, the cutting tool management system generates a cutting tool component assembly task (i.e., the cutting tool component assembly task). The cutting tool measurement form is established in the cutting tool test monitoring system based on the tool holder cart as the unit, and the cutting tool component is automatically sent to the cutting tool measurement form of the cutting tool test monitoring system after assembled in the cutting tool management system. After receiving the tool holder cart ready signal in an industrial Internet of things (IOT) environment and after reading tool holder cart information, the cutting tool test monitoring system matches a corresponding cutting tool measurement form and send the cutting tool measurement form to the cutting tool pre-adjustment test system. The cutting tool test monitoring system further performs determination according to the cutting tool pre-adjustment test system and the state information of the robot fed back by the industrial control system, and then sends a robot task to the industrial control system for the robot-assisted measurement, and after the measurement is completed, the cutting tool pre-adjustment test system feeds back a measurement result of the cutting tool components to the cutting tool measurement form in the cutting tool test monitoring system, and after the completion of all the cutting tool component measurement tasks of the cutting tool measurement form, final measurement form information is returned to the cutting tool management system, and at the same time, a local cutting tool measurement form is deleted.

In some embodiments, the cutting tool management system includes one or more of the following functions.

In some embodiments, after the cutting tool, the shank, and the accessory are outbound, the cutting tool component assembly task is automatically generated, for example, the cutting tool management system generates the cutting tool component assembly task through built-in software.

In some embodiments, the cutting tool management system includes a display device for displaying a progress of the assembly task or an assembly interface. In some embodiments, uncompleted assembly task items are distinguished from completed assembly task items by color.

In some embodiments, the cutting tool measurement form is created in the cutting tool test monitoring system based on the tool holder cart as the unit. In some embodiments, "creating a measurement form" includes "creating a form number", "reading shank information", "reading cutting tool information", and "writing assembly information".

The cutting tool measurement form contains a cutting tool measurement form number, and in some embodiments, the cutting tool test monitoring system determines the corresponding cutting tool measurement form through the cutting tool measurement form number.

In some embodiments, the cutting tool measurement form number is generated combining a tool holder cart ID, a current creation time (e.g., year, month, day, hour, minute, and second), and a work number of an assembler, and then written to a tool holder cart chip. In some embodiments, the measurement form is displayed in the cutting tool test monitoring system as soon as it is created, which indicates that the cutting tool component assembly is able to be performed.

By using the cutting tool measurement form number, an independence of each cutting tool measurement form in the cutting tool test monitoring system is implemented, so as to avoid identification and selection errors.

In some embodiments, the assembler reads the shank information in a shank RFID chip with an RFID reader, and automatically matches the shank information with a shank information field in the assembly task item in the cutting tool management system, after that, the field changes color; i.e., the cutting tool information is read by scanning the QR code on a shank end of the cutting tool using the QR code scanner, and the field changes color after the automatic matching.

In some embodiments, after the assembly task items are matched, the cutting tool management system automatically pops up a cutting tool component assembly interface, and the assembler performs the cutting tool component assembly in real time according to the process requirement, and after completing the assembly and clicking on "writing the assembly information", an assembly serial number and other information is written to the shank chip, and at the same time, the cutting tool component assembly task is automatically sent to the measurement form of the cutting tool test and monitoring system.

In some embodiments, information such as a cutting tool component assembly drawing, a cutting tool position number of the tool holder cart, a number of the tool holder cart, and a cutting tool measurement form number are included in the assembly interface popped-up by the cutting tool management system.

In some embodiments, the cutting tool measurement form includes the cutting tool information, the shank information, the assembly serial number (generated by the cutting tool management system after the cutting tool component assembly is completed), a cutting tool diameter, a length, the cutting tool bottom teeth R, the cutting tool position number of the tool holder cart, a measurement target position, and a macro program name.

In some embodiments, the cutting tool management system manually reads the cutting tool component information by selecting "reads the cutting tool component information" in a drop-down menu or automatically reads the cutting tool component information by scanning the cutting tool component through the industrial IoT environment system.

In some embodiments, the cutting tool test monitoring system includes one or more of the following functions.

In some embodiments, the cutting tool test monitoring system includes a working mode option, and a manual mode and an automatic mode are ready for selection. In some embodiments, the cutting tool test monitoring system in the manual mode sends a message to the industrial control system, the industrial control system controls the robot system not to be enabled, and the safety light curtain at the manual operating position of the cutting tool alignment instrument in the safety system takes effect without triggering an alarm. The robotics system is enabled in automatic mode, and the safety light curtain in the manual position of the cutting tool alignment instrument is in effect to trigger an alarm.

In some embodiments, under the manual mode, the cutting tool alignment instruction returns to a reference point manually, and a main axis datum is calibrated manually. Under the automatic mode, the cutting tool pre-adjustment test system performs a self-test to set the cutting tool alignment instrument in a ready state, and when the cutting tool alignment instrument fails to be set in the ready state, the cutting tool pre-adjustment test system issues an alarm message prompting for a manual intervention. The reference point of the cutting tool alignment instrument is 0 point or other specified positions. The reference point of the cutting tool alignment instrument and the main axis datum are determined according to an actual situation of the cutting tool alignment instrument, which are not limited in the present disclosure.

In some embodiments, the cutting tool test monitoring system independently controls the robot to perform operations including a "robot single-step operation", a "robot returns to an original position", and "robot going to a preset manual intervention position". The robot single-step operation refers to performing operation on the robot by manually issuing a single-step instruction.

In some embodiments, the cutting tool alignment instrument deletes the local cutting tool measurement form after sending the measurement result to the cutting tool test monitoring system, and the cutting tool test monitoring system deletes the local cutting tool measurement form after sending the measurement result to the cutting tool management system.

In some embodiments, a function of the cutting tool test monitoring system further includes sending an automated measurement request: a read/write head reads measurement form number information in the chip of the tool holder cart and sends the measurement form number information to the cutting tool alignment instrument. After receiving the measurement form number information, the cutting tool alignment instrument automatically searches for the measurement form number under a locally specified path, and then loads the measurement form to a measurement interface of the cutting tool measurement software after comparison. In some embodiments, the cutting tool test monitoring system returns an "measure enabled" message to the cutting tool alignment instrument after determining the cutting tool alignment instrument, the robot, and the tool holder cart signal are ready, and after the cutting tool alignment instrument confirms the state, and the cutting tool test monitoring system may be requested to perform the robot operation.

In some embodiments, the cutting tool pre-adjustment test system (the cutting tool alignment instrument) include one or more of the following functions.

In some embodiments, the cutting tool alignment instrument is fully automated computerized numerical control (CNC) driven and the main axis is automatically focused.

In some embodiments, the cutting tool alignment instrument performs actions of "device to a safe position", "device back to the reference point", "main axis reference point calibration", "main axis releases broach", and "one-touch start automatic measurement", and provides feedback based on results of these actions. The feedback includes information of "device in the safe position", "device back to the reference point complete", "main axis reference point calibration complete", "main axis loosening broach in place" and "automatic measurement complete".

In some embodiments, the cutting tool pre-adjustment test system is pre-stored with measurement macro programs for various types of cutting tools, including operations and methods for cutting tool measurement.

In some embodiments, the industrial control system includes an industrial computer and a programmable logic controller (PLC). Specific operations and manners for cutting tool test may be regular, which is not limited by the present disclosure.

In some embodiments, the industrial control system processes I/O signals from the cutting tool pre-adjustment test system and the robot system.

In some embodiments, the industrial control system issues four task categories to the robot according to the instruction from the cutting tool test monitoring system: task 1: from the tool holder cart to the cutting tool alignment instrument, placing the cutting tool component from the tool holder cart to the cutting tool alignment instrument main axis; task 2: from the cutting tool alignment instrument to the tool holder cart, placing the cutting tool component from the cutting tool alignment instrument main axis to the tool holder cart; task 3: removing the cutting tool component from the cutting tool alignment instrument main axis and placing the cutting tool component back onto the cutting tool alignment instrument main axis; and task 4: running the robot to the manual intervention position.

In some embodiments, the robot is further configured as: a robot main program including a robot self-test, the robot self-test including: when the end effector of the robot is gripped with subjects, the robot performs the "task 4", according to which the robot runs to the manual intervention position, and issues an alarm to the cutting tool test monitoring system, and, after the manual intervention, the robot is restarted and set in the ready state.

Figure 2:
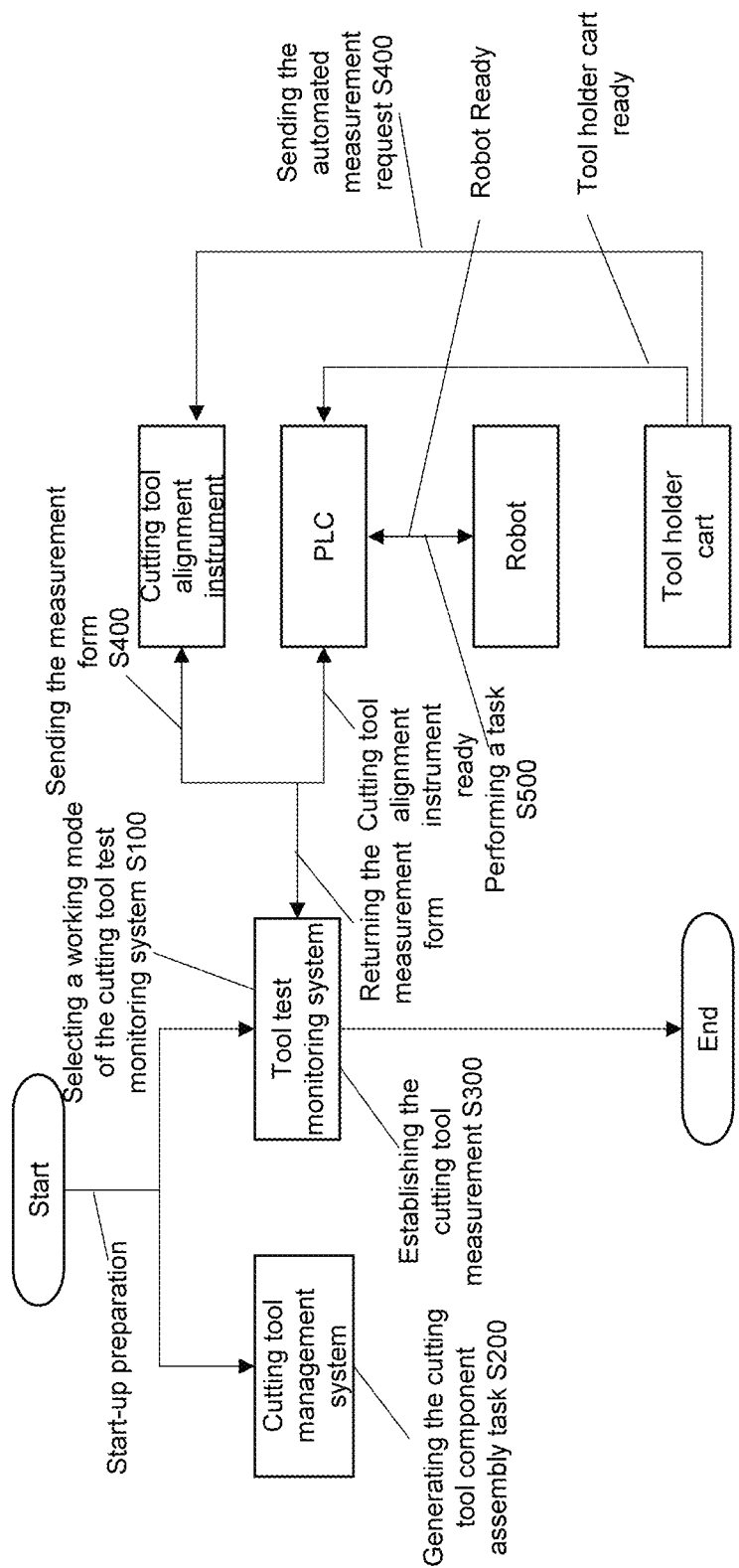
FIG. 2 is a block diagram illustrating a method for cutting tool test according to some embodiments of the present disclosure.

Some embodiments of the present disclosure also provide a method for cutting tool test. The method is performed using the above-described system for cutting tool test, as illustrated in FIG. 2, the method includes one or more of the following operations.

Start-up preparation: starting the cutting tool management system, the cutting tool test monitoring system, powering up the cutting tool alignment instrument, powering up the PLC, powering up the robot, and running the robot main program.

In some embodiments, the robot main program includes a robot self-test, and when the end effector of the robot is gripped with subjects, the robot performs "task 4" (running to the human intervention position) and issues an alarm to the cutting tool test monitoring system. When the main robot program is restarted after the human intervention and passes the self-test, the robot is placed in the ready state.

In S100, selecting a working mode of the cutting tool test monitoring system. The working mode is divided into two modes: a manual mode and an automatic mode. In response to selecting the manual mode, the cutting tool pre-adjustment test system is controlled to perform an operation of the cutting tool test monitoring system returning to the reference point, and calibrating the main axis datum point; in response to selecting the automatic mode, the cutting tool pre-adjustment test system controls the cutting tool pre-adjustment test system to perform the self-test and feedback the ready state of the cutting tool pre-adjustment test system, and controls the robot to perform the self-test and feedback the ready state through the industrial control system, at which time the cutting tool test monitoring system is in the ready state.

In some embodiments, the manual mode is selected, the cutting tool test monitoring system sends a signal to the PLC, the PLC controls the robot not to be enabled, and the cutting tool alignment instrument is configured as the safety light curtain at the manual operating position of the cutting tool alignment instrument takes effect without triggering the alarm. In the automatic mode, the robot is enabled, and the safety light curtain at the manual operating position of the cutting tool alignment instrument takes effect.

In some embodiments, after selecting the manual mode, an operator enters a cutting tool alignment instrument work region and performs the cutting tool alignment instrument returning to the reference point to calibrate the main axis datum point. After selecting the automatic mode, the cutting tool alignment instrument performs a self-test and then feeds back the ready state, and if the ready state is unable to be fed back, the cutting tool alignment instrument feeds back the alarm message. In some embodiments, the safety device is placed in the ready state after completing the self-test. The system for cutting tool test is placed in the ready state when the robot is ready, the cutting tool alignment instrument is ready, and the safety device is ready.

In S200, generating the assembly task. After the cutting tool, the shank, and the accessory are outbound, a cutting tool component assembly task is generated in the cutting tool management system. The cutting tool component assembly task includes the information of the assembly drawing, the cutting tool position number of the tool holder cart, the number of the tool holder cart, and the form number, The cutting tool component assembly task includes the assembly drawing, cutting tool position number of the tool holder cart, tool holder cart number, and form number. When an assembly task number reaches a cutting tool position number of the tool holder cart, the cutting tool management system pops up a prompt and displays a pending assembly state after the operator confirms an immediate assembly.

In some embodiments, the cutting tool management system pops up the prompt including "new assembly task, whether to assemble immediately". When the operator confirms to assemble immediately, the selected task items are colored in white, indicating that the task items are to be assembled.

In S300, creating the measurement form. The cutting tool measurement form is created in the cutting tool test monitoring system. The creating the measurement form includes "creating the form number", "reading the shank information", "reading the cutting tool information", and "writing the assembly information". There may be two tool holder carts. In some embodiments, a working process of the "creating the measurement form" includes: after the cutting tool holder cater loaded with the shank, the cutting tool, and the accessory reaches the assembly station and after the tool holder carts used to load the cutting tool system reach the assembly station respectively, the operator enters a "creating form" column of the cutting tool test monitoring system, clicks on a "creating form number", uses the read/write head to read the number of the tool holder cart in the chip of the cutting tool holder cater, such as "djc001", and then combines the number of the tool holder cart with the current creation time (year, month, day, hour, minute, and second) and the work number of the assembler, to generate the form number "djc001-20211029163028-273154", and writes the form number into the chip of the tool holder cart, after which a monitoring screen displays a prompt box "form number creation is complete".

In some embodiments, after the assembler clicks on "reading the shank information", the RFID read/write head reads out the shank information in the shank RFID chip and matches the shank information with the shank information field in the cutting tool component assembly task in the cutting tool management system, and the field changes color. Then the assembler reads the cutting tool information using the QR code scanner to scan the QR code on the end of the shank of the cutting tool and matches the field.

In S400, sending the measurement form. When the cutting tool component assembly task is completed, the cutting tool management system sends a cutting tool measurement task to the cutting tool test monitoring system and updates the cutting tool measurement form, and sends the updated cutting tool measurement form to the cutting tool pre-adjustment test system.

The cutting tool measurement task is generated by the cutting tool management system, and is used to instruct the cutting tool management system to perform measurement on the cutting tool, and to record the measurement data to the cutting tool measurement form.

In some embodiments, after the shank information and the cutting tool information fields in the cutting tool component assembly task are matched at the same time, a pop-up is displayed in the "cutting tool management system" interface. The pop-up includes the assembly drawing, the cutting tool position number of the tool holder cart, the number of the tool holder cart, and the form number, etc. In some embodiments, after the operator completes assembling the cutting tool system according to the requirements of the information on the assembly interface, and places the cutting tool system according to the cutting tool position number of the tool holder cart assigned by the cutting tool test monitoring system, the operator clicks "assembly complete", and the cutting tool measurement task is automatically sent to the measurement form created in the cutting tool test monitoring system. The measurement form includes the cutting tool information, the shank information, the assembly serial number, the nominal value (the cutting tool diameter, the length, the cutting tool bottom teeth R), the cutting tool position number of the tool holder cart, the measurement target position, and the macro program name.

S400 further includes: sending the automated measurement request. The cutting tool pre-adjustment test system loads the measurement form to the measurement interface of the cutting tool measurement software; after confirming that the cutting tool pre-adjustment test system, the tool holder cart, and the robot are in the ready state, the cutting tool test monitoring system sends a measurement instruction to the cutting tool pre-adjustment test system, and the cutting tool pre-adjustment test system feeds back request information to perform the robot operation. The measurement instruction is used to instruct the cutting tool pre-adjustment test system to use the robot-assisted measurement.

In some embodiments, the RFID read/write head reads the measurement form number information within the chip of the tool holder cart to send the form number information to the cutting tool alignment instrument. After receiving the measurement form number information, the cutting tool alignment instrument automatically searches for the measurement form number under a locally specified path, and loads the measurement form to the measurement interface of the cutting tool measurement software after comparison. In some embodiments, the cutting tool test monitoring system asks whether the cutting tool alignment instrument, the robot, and the cutting tool holder car signal are ready or not, and then feeds back "enable measurement" information to the cutting tool alignment instrument, after the cutting tool alignment instrument confirms the state, the cutting tool alignment instrument requests the cutting tool test monitoring system to perform the robot operation.

In S500, performing the task. The cutting tool test monitoring system controls the robot to perform the task (assisted measurement) through the industrial control system.

In S600, completing the measurement: the cutting tool pre-adjustment test system sends the measurement result to the cutting tool test monitoring system and deletes the local cutting tool measurement form, the cutting tool test monitoring system sends the measurement result to the cutting tool management system and deletes the local cutting tool measurement form.

In some embodiments, S500 includes one or more following operations.

In S501, performing task one: loading the shank into a main axis of the cutting tool pre-adjustment test system, starting an automatic measurement: reading the assembly serial number in the shank chip to match the assembly serial number in the cutting tool measurement form, loading nominal value information; calling a macro program measurement, and after the measurement is complete and a result of the measurement is within tolerance, writing the result to the shank chip, and writing the result to a measurement form result.

In S502, performing task two: measuring whether a deviation exceeds tolerance.

In S503, performing task three: measuring whether the deviation exceeds tolerance again, in response to that a measurement result is qualified (the deviation does not exceed tolerance), writing the measurement result to the shank chip, in response to that the measurement result is not qualified (the deviation does not exceed tolerance), alarming to feedback that the measurement result is out of tolerance.

In S504, performing task four: running the robot to the manual intervention position and setting the robot in the ready state.

In some embodiments, the robot performs "task 1: from the tool holder cart to the cutting tool alignment instrument", the shank is loaded into the main axis of the cutting tool pre-adjustment test system (the cutting tool alignment instrument), and the automatic measurement is started. In some embodiments, task one further includes: in a first step, reading the assembly serial number in the shank chip, matching the assembly serial number in the measurement form with the assembly serial number in the shank chip, and loading the nominal value information. In a second step, the macro program measurement is called, and after the measurement is complete and a result of the measurement is within tolerance, the result is written to the shank chip, and the cutting tool measurement form is updated. In a third step, after writing the result to the shank chip, the cutting tool alignment instrument is ready, the robot performs "task two: from the cutting tool alignment instrument to the tool holder cart", in response to the measurement is successful and the measurement error exceeds tolerance, the robot performs "task three: from the cutting tool alignment instrument to the cutting tool alignment instrument", and performs measurement again, in response to that the measurement result is qualified, the robot writes the measurement result to the shank chip, and in response to that the measurement result is not qualified, then the robot issues an alarm "measurement exceeds tolerance". "Task four": running the robot to the manual intervention position and setting the robot in the ready state.

By using the robot-assisted measurement, a production efficiency can be effectively improved, and after the robot performs a part of manual operations, only 1-2 people are required on site for completing the cutting tool assembly and measurement work.

Beneficial effects that can be achieved by some embodiments of the present disclosure include, but are not limited to the followings.

(1) Some embodiments of the present disclosure are applicable to fully automatic cutting tool measurement by robot-assisted cutting tool alignment instruments on digital workshop production lines, so as to realize the cutting tool test with automatic integration of information, which effectively improves the production efficiency, and has a good practicality.

(2) Some embodiments of the present disclosure satisfy requirements for development and construction of intelligent workshops, and helps to realize an automated workshop process operation and replace human by machine in a logistics process. Compared with the existing technology, after replacing human operations with robot operations, only 1-2 people are required on site to complete the cutting tool assembly and measurement work, and the logistic process of cutting tool outbound, loading and unloading, and measurement can be monitored.

(3) In some embodiments of the present disclosure, the shank information is written into the chip, and the cutting tool information is recorded by the QR code, which is read directly by a chip reading and writing device and the QR code scanner, so as to avoid an occurrence of a problem of cutting tool matching error and improve a process quality.

(4) Some embodiments of the present disclosure achieve a visualization of the assembly process and an automated integration of the assembly information, which is of good practicality. The process information in the cutting tool management system is displayed in the cutting tool management system according to an enterprise resource planning (ERP) instruction. When the assembler installs the shank on an assembly base, the RFID read head automatically reads the shank information in the chip and automatically corresponds to the shank in the process information. When the assembler reads the cutting tool information with the QR code scanner and matches the process information completely, the screen automatically pops up specific process requirements of the assembly information and a position number of the assembled cutting tool on the tool holder cart. After the assembly is completed, the cutting tool management system automatically sends the measurement task to the cutting tool alignment instrument.

The foregoing is only a preferred embodiment of some embodiments of the present disclosure, and is not a limitation in any form of some embodiments of the present disclosure. Any simple modification or equivalent change to the above embodiments based on the technical substance of some embodiments of the present disclosure falls within the scope of protection of some embodiments of the present disclosure.

What is claimed is:

1. A method for cutting tool test, the method being performed by a system for cutting tool test, wherein the system for cutting tool test includes a cutting tool management system, a cutting tool test monitoring system, a cutting tool pre-adjustment test system, an industrial control system, and a robot connected in sequence, wherein the industrial control system is connected to the cutting tool test monitoring system and the robot, respectively; the cutting tool management system is used to establish a cutting tool component assembly task and send the cutting tool component assembly task to the cutting tool test monitoring system after completing a cutting tool outbound task; the cutting tool test monitoring system is used to establish a cutting tool measurement form based on a tool holder cart as a unit, and after receiving a cutting tool preparation signal of the tool holder cart, match the cutting tool preparation signal of the tool holder cart and the corresponding cutting tool measurement form and send the cutting tool measurement form to the cutting tool pre-adjustment test system; the cutting tool pre-adjustment test system is used to measure according to the cutting tool measurement form, and feedback a cutting tool measurement result to the cutting tool test monitoring system for updating the cutting tool measurement form; the cutting tool test monitoring system is used to send a final updated cutting tool measurement form to the cutting tool management system; the industrial control system is used to receive state information of the robot and send task information of the robot to control the robot for a robot-assisted measurement;

the method includes following operations:

step S100: selecting a working mode of the cutting tool test monitoring system, and in response to selecting a manual mode, controlling the cutting tool pre-adjustment test system to perform an operation of the cutting tool test monitoring system returning to a reference point, and calibrating a main axis datum point; in response to selecting an automatic mode, controlling the cutting tool pre-adjustment test system to perform a self-test and feedback a ready state, and controlling the robot to perform a self-test and feedback a ready state through the industrial control system, at which time the cutting tool test monitoring system is in a ready state;

step S200: after a outbound operation of a cutting tool, a shank, and an accessory is completed, generating the cutting tool component assembly task in the cutting tool management system, the cutting tool component assembly task including information of an assembly drawing, a cutting tool position number of the tool holder cart, a number of the tool holder cart, and a form number; wherein when the cutting tool component assembly task number reaches the cutting tool position number of the tool holder cart, the cutting tool management system pops up a prompt and displays a pending assembly state after an operator confirms an immediate assembly;

step S300: establishing the cutting tool measurement form in the cutting tool test monitoring system, the cutting tool measurement form including cutting tool information, shank information, an assembly serial number, a nominal value, the cutting tool position number of the tool holder cart, a measurement target position, and a macro program name;

step S400: when the cutting tool component assembly task is completed, sending, through the cutting tool management system, a cutting tool measurement task to the cutting tool test monitoring system and updating the cutting tool measurement form, sending the updated cutting tool measurement form to the cutting tool pre-adjustment test system, loading, through the cutting tool pre-adjustment test system, the cutting tool measurement form to a measurement interface of a cutting tool measurement software; after confirming that the cutting tool pre-adjustment test system, the tool holder cart, and the robot are in the ready state, sending, through the cutting tool test monitoring system, a measurement instruction to the cutting tool pre-adjustment test system, and the cutting tool pre-conditioning test system being configured to feedback request information to perform a robot operation;

step S500: controlling, through the cutting tool test monitoring system, the robot to perform a task through the industrial control system; and step S600: sending, through the cutting pre-adjustment test system, the cutting tool measurement result to the cutting tool test monitoring system and deleting a local cutting tool measurement form.

2. The method of claim 1, wherein the step S500 includes:

step S501: performing task one: loading the shank into a main axis of the cutting tool pre-adjustment test system, starting an automatic measurement: reading an assembly serial number in a shank chip to match the assembly serial number in the cutting tool measurement form, loading nominal value information; calling a macro program measurement, and after the measurement is complete and a result of the measurement is within tolerance, writing the result to the shank chip, and writing the result to a measurement form result;

step S502: performing task two: measuring whether a deviation exceeds the tolerance;

step S503: performing task three: measuring whether the deviation exceeds the tolerance again, in response to that a measurement result is qualified (the deviation does not exceed the tolerance), writing the measurement result to the shank chip, and in response to that the measurement result is not qualified (the deviation exceeds the tolerance), alarming to feedback that the measurement result is out of the tolerance; and step S504: performing task four: running the robot to a manual intervention position and setting the robot in a ready state.

3. The method of claim 1, wherein in the step S300, the cutting tool measurement form is generated by combining an identification of the tool holder cart with a current creation time and a work number of an assembler, and written into a chip of the tool holder cart.

\* \* \* \* \*